(12) United States Patent
Sato

(10) Patent No.: US 7,124,498 B2
(45) Date of Patent: Oct. 24, 2006

(54) METHOD FOR MANUFACTURING MAGNETIC HEAD

(75) Inventor: Kiyoshi Sato, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 11/127,725

(22) Filed: May 12, 2005

(65) Prior Publication Data

US 2005/0257365 A1 Nov. 24, 2005

(30) Foreign Application Priority Data

May 20, 2004 (JP) ............................ 2004-149839

(51) Int. Cl.
*G11B 5/127* (2006.01)

(52) U.S. Cl. .................. 29/603.13; 29/603.14; 29/603.15; 29/603.18; 360/125

(58) Field of Classification Search ............. 29/603.12, 29/603.01, 603.07, 603.13, 603.16; 360/125, 360/126, 317, 121, 119; 451/57, 58, 48; 427/595, 596, 597

See application file for complete search history.

(56) References Cited

U.S. PATENT DOCUMENTS

| | | | | |
|---|---|---|---|---|
| 4,799,118 A | * | 1/1989 | Yamada et al. ............. | 360/125 |
| 5,600,519 A | * | 2/1997 | Heim et al. ................. | 360/126 |
| 5,867,890 A | | 2/1999 | Hsiao et al. | |
| 6,441,995 B1 | * | 8/2002 | Sasaki ........................ | 360/126 |
| 6,515,824 B1 | * | 2/2003 | Sato ........................... | 360/126 |

FOREIGN PATENT DOCUMENTS

JP 2001-143222 5/2001

* cited by examiner

*Primary Examiner*—A. Dexter Tugbang
*Assistant Examiner*—Tai Van Nguyen
(74) *Attorney, Agent, or Firm*—Brinks Hofer Gilson & Lione

(57) ABSTRACT

A non-magnetic material layer which is formed with a taper region of which the film thickness is gradually reduced over the top surface and the side of an upper core layer and the side of the gap layer is formed by cutting the gap layer and the upper core layer on a lower core layer with a track width and the lower periphery of the taper region is contacted with the top surface of the lower core layer. On the top surface of the lower core layer extending from the lower periphery of the taper region to the both sides, the slopes inclined in the direction apart from the upper core layer are formed and a protrusion having a track width is formed on the lower core layer. The material layer having the same material as the lower core layer adhered to the outside of the non-magnetic material layer is removed.

5 Claims, 15 Drawing Sheets

FIG. 2
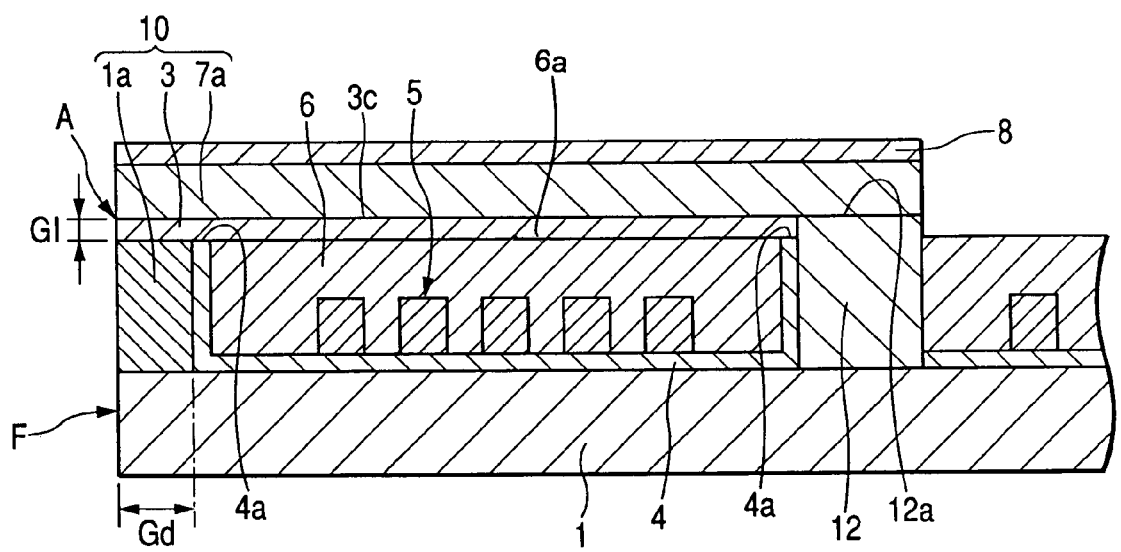
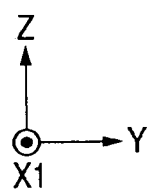

FIG. 12
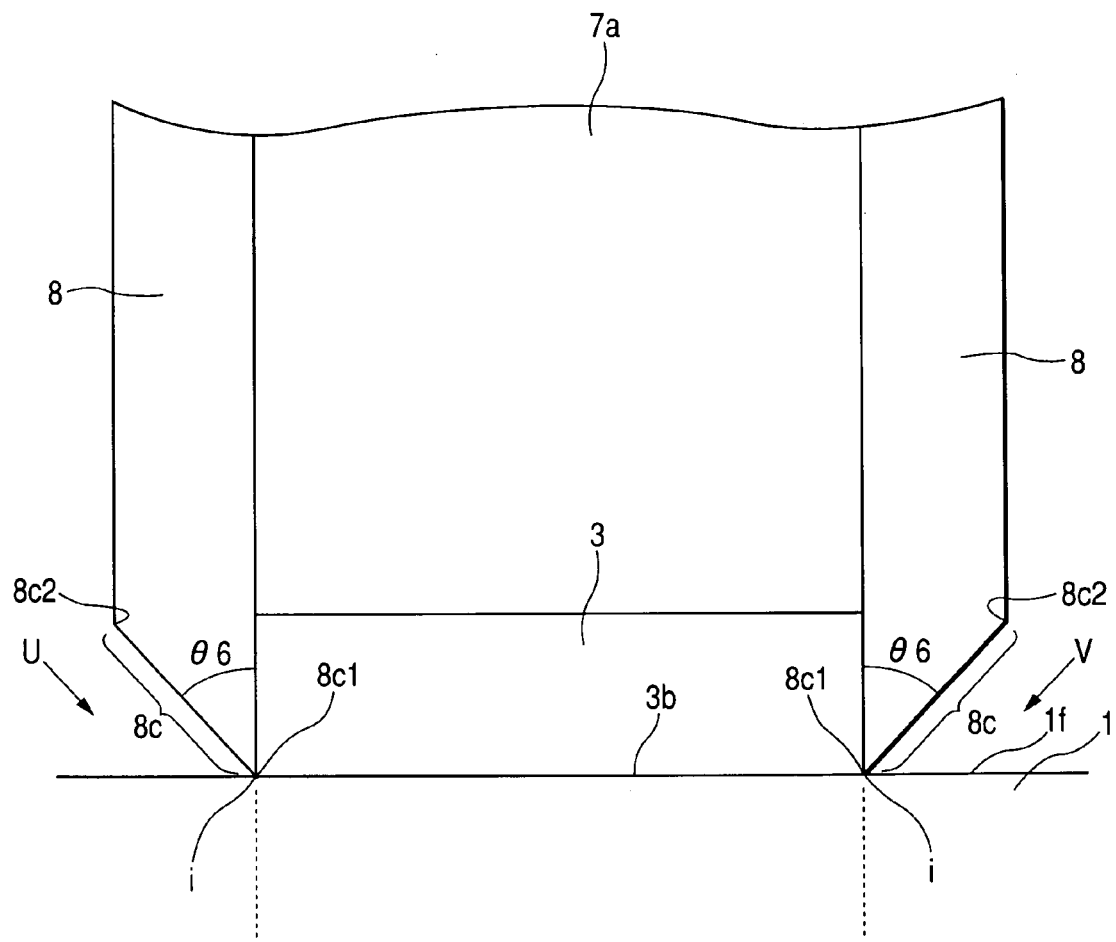
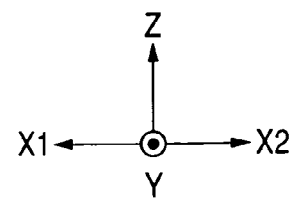

FIG. 13
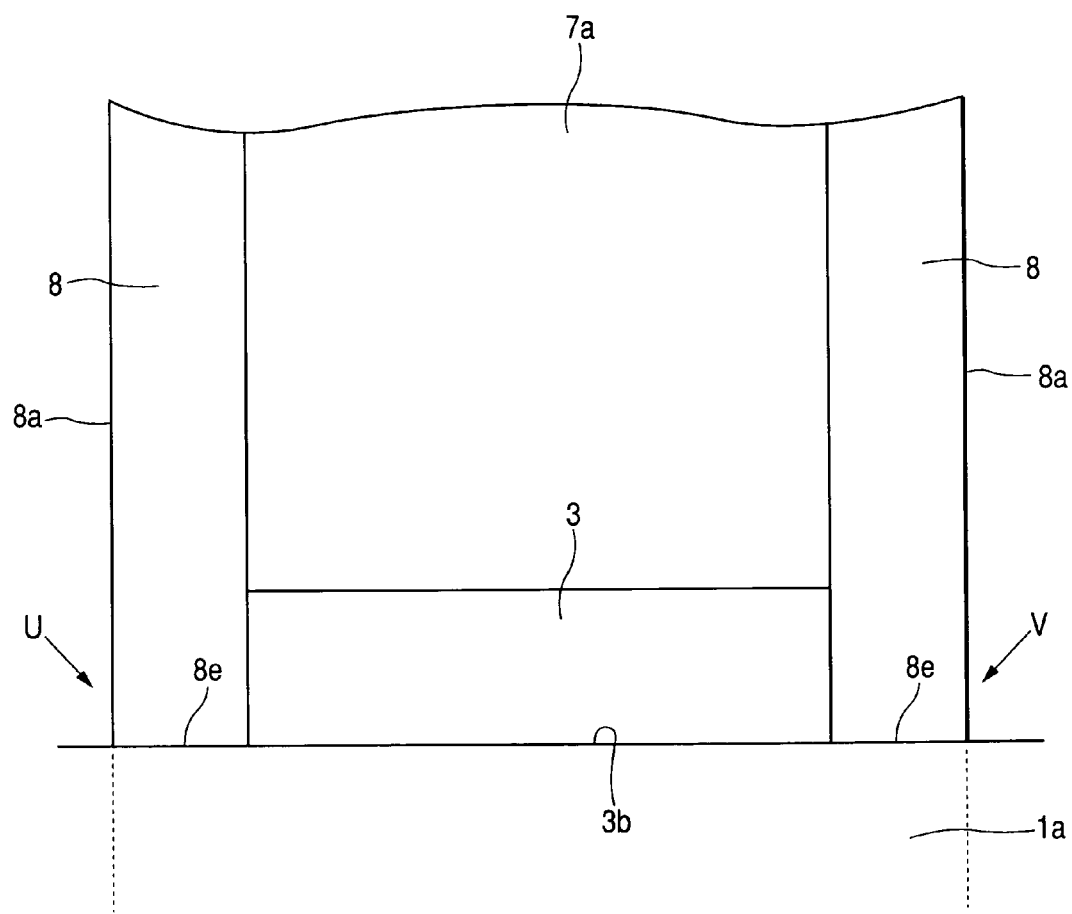
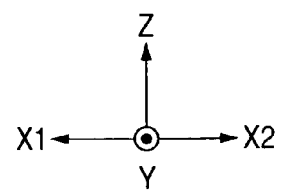

FIG. 16 PRIOR ART
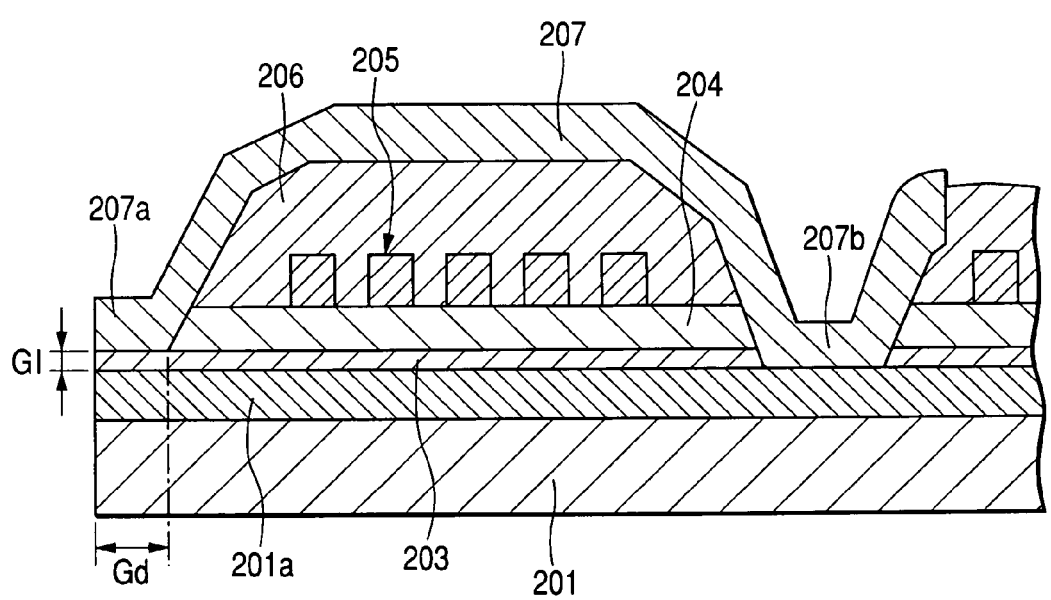
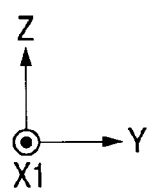

FIG. 19
PRIOR ART
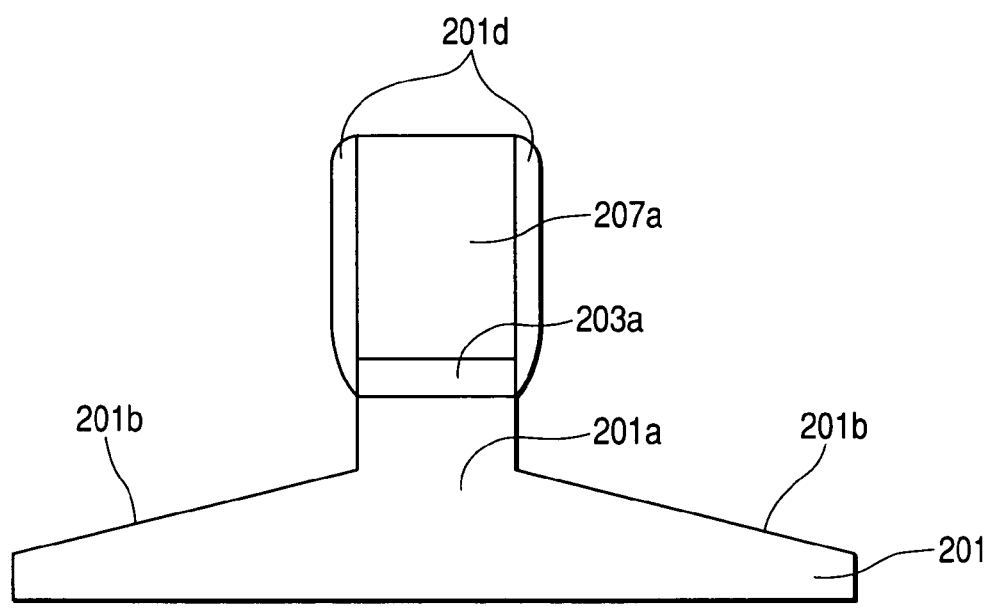
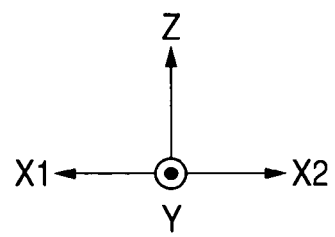

METHOD FOR MANUFACTURING MAGNETIC HEAD

This application claims the benefit of priority to Japanese Patent Application No. 2004-149839 filed on May 20, 2004, herein incorporated by reference.

BACKGROUND OF THE INVENTION

1. Field of the Invention

The present invention relates to an inductive magnetic head used in, for example, a floating magnetic head, and more particularly, to a method of manufacturing a magnetic head in which a track width of a recording magnetic gap is precisely formed and light fringing can be suppressed.

2. Description of the Related Art

FIG. 15 is a partial front view of the vicinity of a magnetic pole of a conventional magnetic head, which is viewed from the surface opposing a recording medium, and FIG. 16 is a partial longitudinal cross-sectional view of the magnetic head shown in FIG. 15. The magnetic head shown in FIGS. 15 and 16 is an inductive head for writing a signal onto the recording medium such as a hard disk. This inductive head is laminated on a reading head using a magnetoresistance effect in the trailing side section of a slider of the floating magnetic head opposing to the recording medium such as a hard disk. However, the magnetic head may be composed of only the inductive head, without providing the reading head.

Reference numeral 201 shown in FIGS. 15 and 16 denotes a lower core layer formed of a magnetic material having a high magnetic permeability, such as Fe—Ni based alloy (Permalloy). A compound type thin film magnetic head on which the inductive head shown in FIGS. 15 and 16 is successively laminated at upper side (Z direction) of the reading head (not shown) using the magnetoresistance effect is composed and the lower core layer 201 functions as an upper shielding layer of the reading head. The lower core layer 201 is formed with a rectangular protrusion 201a integral with the lower core layer 201.

On the lower core layer 201, a gap layer 203 made of non-magnetic material such as $Al_2O_3$ (alumina) is formed. On the gap layer 203, a coil insulating underlaying layer 204 made of resist material or other organic material is formed.

On the coil insulating underlaying layer 204, a coil layer 205 made of a conductive material having a low electric resistance, such as Cu, is formed in a spiral shape. Further, the coil layer 205 is formed so as to surround the periphery of a base end 207b of an upper core layer 207, but only a portion of the coil layer 205 is shown in FIG. 16.

Therefore, on the coil layer 205, an insulating layer 206 composed of an organic insulating material or an inorganic insulating material is formed. On the insulating layer 206, a magnetic material having a high magnetic permeability, such as Permalloy, is plated to form the upper core layer 207. The front end 207a of the upper core layer 207 is bonded onto the lower core layer 201 through the gap layer 203 in the portion opposing the recording medium and a magnetic gap having a gap length G1 is formed. Further, the base end 207b of the upper core layer 207 is magnetically connected to the lower core layer 201.

In the writing inductive head, if a recording current is applied to the coil layer 205, a recording magnetic field is induced to the lower core layer 201 and the upper core layer 207 and the magnetic signal is recorded in the recording medium such as the hard disk by a leakage magnetic filed from the magnetic gap between the lower core layer 201 and the front end 207a of the upper core layer 207.

Furthermore, on the top surface of the lower core layer 201 extending in the both sides of the base end of the protrusion, slopes 201b, 201b are formed.

In the magnetic head shown in FIGS. 15 and 16, since the protrusion 201a is formed, the leakage magnetic field generated between the protrusion 201a and the upper core layer 207 is surely converged in the width Tw (=track width) of the upper core layer 207 and thus the light fringing can be suppressed. Also, since the slope 201b is formed at the lower core layer 201 and the distance between the slope 201b and the upper core layer 207 can be widened, it is difficult to generate the leakage magnetic field between the upper core layer 207 and the lower core layer 201 extending from the base end of the protrusion 201a and thus the light fringing can be suppressed.

The method of manufacturing the inductive head is disclosed in Japanese Unexamined Patent Application Publication No. 2001-143222 (hereinafter, refer to Patent Document 1). FIGS. 17 and 18 show a process for forming a magnetic pole of the inductive head described in paragraph [0135] of Patent Document 1.

In the method of manufacturing the magnetic pole of the inductive head described in Patent Document 1, as shown in FIG. 17, the gap layer 203 and the front end 207a of the upper core layer 207 are formed in this order from the lower side, on the lower core layer 201 of which the front shape which is viewed from the surface opposing the recording medium is rectangular. At this time, the states of the gap layer 203 and the front end 207a of the upper core layer 207 are shown by a dashed line and the width in the track width direction (X1-X2 direction) of the gap layer 203 and the front end 207a is T5.

Next, for example, the sides of the gap layer 203 and the front end 207a are cut by an ion milling process in which an ion irradiating angle θ10 is in the range of 60° to 75° and the width in the track width direction of the gap layer 203 and the front end 207a is T6. The width T6 is controlled to the track width Tw. The states of gap layer 203 and the front end 207a at this time are shown by a solid line in the drawing. Also, the top surface 201c of the lower core layer 201 is cut from the state shown by the solid line to the state shown by the dotted line and thus the protrusion 201a is formed on the lower core layer 201.

Next, as shown in FIG. 18, if the ion irradiating angle θ11 is changed in the range of 45° to 60° to form the slope 201b at the top surface 201c of the lower core layer 201, and the magnetic pole of the conventional inductive head shown in FIGS. 15 and 16 is formed.

On the other hand, FIGS. 3A through 3E of U.S. 005867890A (hereinafter, refer to Patent Document 2) describes another method of forming the magnetic pole of the inductive head. In the process shown in FIG. 3A of Patent Document 2, a gap layer (G) is entirely formed on a bottom pole piece (P1/S2) which functions as the lower core layer and a top pole piece (PT2) which functions as the upper core layer is formed on the gap layer. Next, after forming a non-magnetic material layer (SL) from the top pole piece (PT2) to the gap layer (G) in the process shown in FIG. 3B, the non-magnetic material layer (SL) and the gap layer (G) formed on the top surface of the bottom pole piece (P1) is removed by using a reactive ion etching (RIE) method in the process shown in FIG. 3C, and then the non-magnetic material layer (SL) is formed at the side of the top pole piece (PT2) as shown in FIG. 3D. At this time, the width of the non-magnetic material layer (SL) is a constant width in the vertical direction. Next, as shown in FIG. 3E, the bottom pole piece (P1/S2) is cut by the ion milling process and a bottom pole chip element (PT1a) and a top pole chip element (TP1b) which is the protrusion are formed in the bottom pole piece (P1/P2), thereby forming the magnetic pole of the inductive head.

However, in the method of manufacturing the inductive head shown in FIGS. 17 and 18 of Patent Document 1, when the top surface 201c of the lower core layer 201 is cut to form the slope 201b in the process shown in FIG. 18, the cut lower core layer 201 is reattached to the front end 207a of the upper core layer 207 and the gap layer 203 and thus a reattached layer 201d is formed at the side of the front end 207a of the upper core layer 207 and the side of the gap layer 203.

Here, since both the lower core layer 201 and the upper core layer 207 are formed of the magnetic material such as Permalloy, there is a problem in that the track width Tw controlled in the process shown in FIG. 18 becomes substantially large.

On the other hand, in the method of manufacturing the inductive head described in Patent Document 2, the top pole chip element (PT1b) is formed by forming the non-magnetic material layer (SL) at only the side of the top pole piece (PT2) and then cutting the bottom pole piece (P1/S2) at an interval controlled by the width between one outside and the other outside of the non-magnetic material layer (SL) formed with a constant width in the vertical direction. Since the width of the top pole chip element (PT1b) cut by the ion milling process is the width between one outside and the other outside of the non-magnetic material layer (SL), the width of the top pole piece (PT2) is different from that of the top pole chip element (PT1b) at the boundary of the gap layer (G). Accordingly, when the recording magnetic filed generated from the top pole piece (PT2) formed with a narrow width flows through the bottom pole piece (P1/S2) formed with a wide width, the recording magnetic field becomes spread and the light fringing is apt to be generated.

Further, when cutting the bottom pole piece (P1/S2) by the ion milling process in the process shown in FIG. 3E, the non-magnetic material layer (SL) is formed at the side of the top pole piece (PT2). Therefore, the width of the top pole piece (PT2) is not reduced by the ion milling process. However, since the non-magnetic material layer (SL) is not formed at the side of the gap layer (G), the side of the gap layer (S) is cut or the bottom pole piece (P1/S2) cut by the ion milling process is reattached to the side of the gap layer (G) upon the ion milling process and thus the width of the gap layer (G) is varied.

SUMMARY OF THE INVENTION

The present invention is made in order to solve the above problems, and it is an object of the present invention to provide a method of manufacturing a magnetic head with a uniform quality, which is capable of precisely forming the track width of a magnetic pole and of suppressing light fringing.

The present invention provides a method of manufacturing a magnetic head having a lower core layer made of a magnetic material, an upper core layer which is made of a magnetic material and opposes the lower core layer with a gap layer interposed therebetween which is made of non-magnetic material and a coil layer which induces the recording magnetic field to the lower core layer and the upper core layer. The method includes:

(a) forming the gap layer on the lower core layer and forming the upper core layer on the gap layer;

(b) cutting the upper core layer and the gap layer so as to have a track width;

(c) forming a non-magnetic material layer having a taper region of which the film thickness is gradually reduced toward the lower core layer, at the side, the top surface of the upper core layer, and the side of the gap layer, and contacting the lower periphery of the taper region with the top surface of the lower core layer thereupon;

(d) cutting the top surface of the lower core layer extending from the lower periphery of the taper region to the both sides to form the slopes inclined in the direction apart from the upper core layer and cutting the lower core layer in the lower direction to form the protrusion having the track width; and (e) removing a material layer composed of the same material as the lower core layer adhered to the outside of the non-magnetic material layer, when cutting the lower core layer in the step (d).

In this case, it is preferable that, in the step (c), the non-magnetic material layer is formed by an IBD (Ion Beam Deposition) method performed in the state that the top surface of the upper core layer and the gap layer are sloped by 70° to 90° with respect to the horizontal direction.

Also, it is preferable that the step (b) is performed by an ion milling process that the ion is irradiated from the direction sloped by the angle θ1 with respect to the direction perpendicular to the boundary between the gap layer and the upper core layer.

Furthermore, it is preferable that, in the step (c), the non-magnetic material layer is formed of the material having a polishing rate slower than that of the lower core layer.

Moreover, it is preferable that, in the step (c), the non-magnetic material layer is formed of a single layer film of $SiO_2$, $Al_2O_3$, Ru, Ta, Ti or a composite film or a multilayer film made of at least two kinds thereof.

The lower periphery of the taper region formed in the non-magnetic material layer is formed in contact with the top surface of the lower core layer. The height location of the lower periphery of the taper region is equal to the height location of the lower surface of the gap layer. Accordingly, since the width in the track width direction of the protrusion becomes the width in the track width direction of the upper core layer in the ion milling process, the magnetic head which can suppress the light fringing can be manufactured.

Also, since the gap layer and the upper core layer formed with the track width is protected when removing the material layer having the same material as the lower core layer adhered to the outside of the non-magnetic material layer upon forming the slopes in the lower core layer, the track width Tw of the gap layer and the upper core layer is not changed. Accordingly, the track width Tw can be precisely formed and the inductive head Hw having a uniform quality can be manufactured.

BRIEF DESCRIPTION OF THE DRAWINGS

FIG. 2 is a cross-sectional view of line II—II of the magnetic head shown in FIG. 1;

FIG. 12 illustrates the step shown in FIG. 11 in detail;

FIG. 13 illustrates the step shown in FIG. 11 in detail;

FIG. 16 is a partial longitudinal cross-sectional view shown in FIG. 15;

FIG. 19 illustrates the step shown in FIG. 18 in detail.

DESCRIPTION OF THE PREFERRED EMBODIMENT

Figure 1:
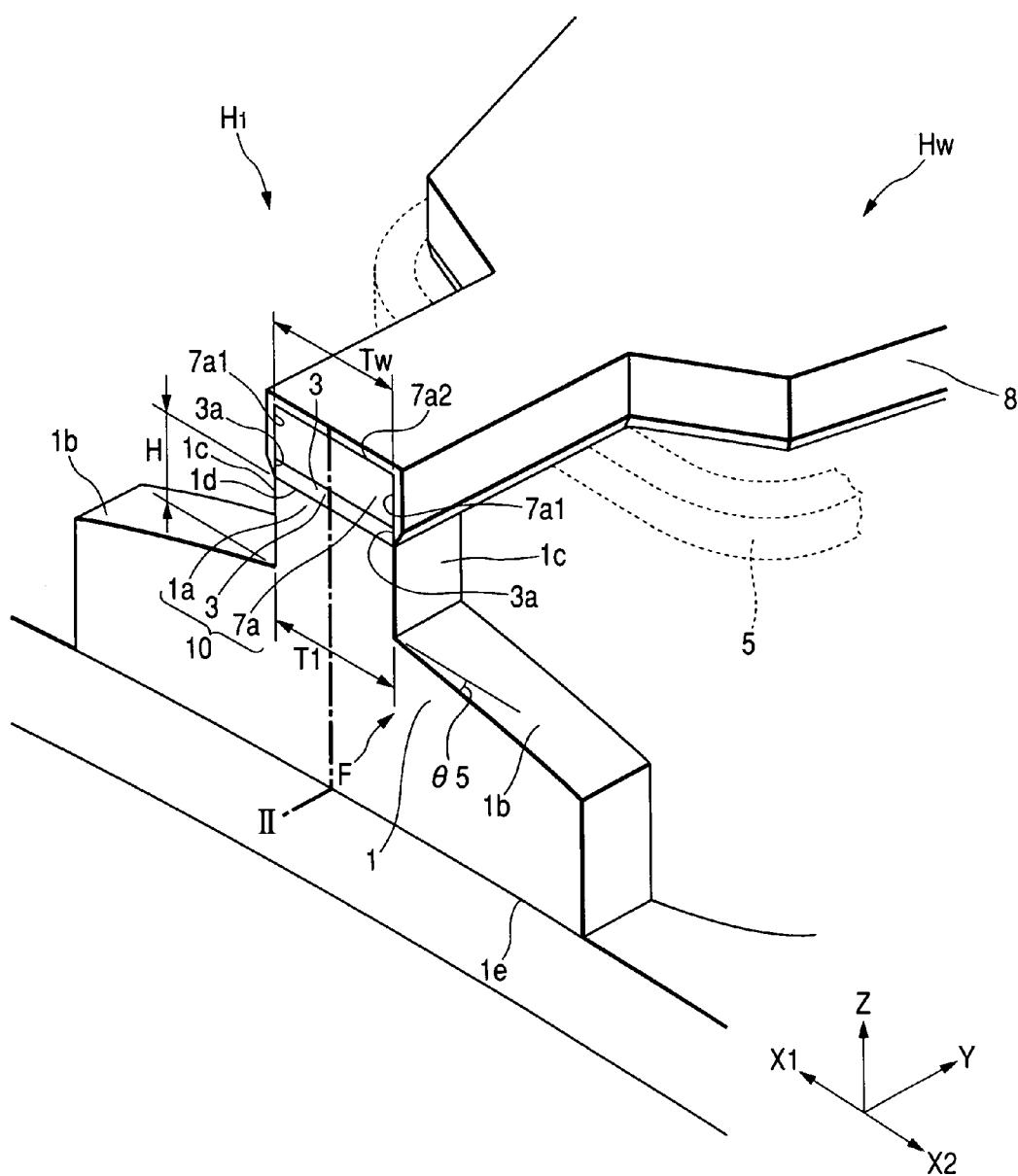
FIG. 1 is a partial perspective view showing a writing magnetic gap forming portion of a magnetic head according to an embodiment of the invention.
Figure 3:
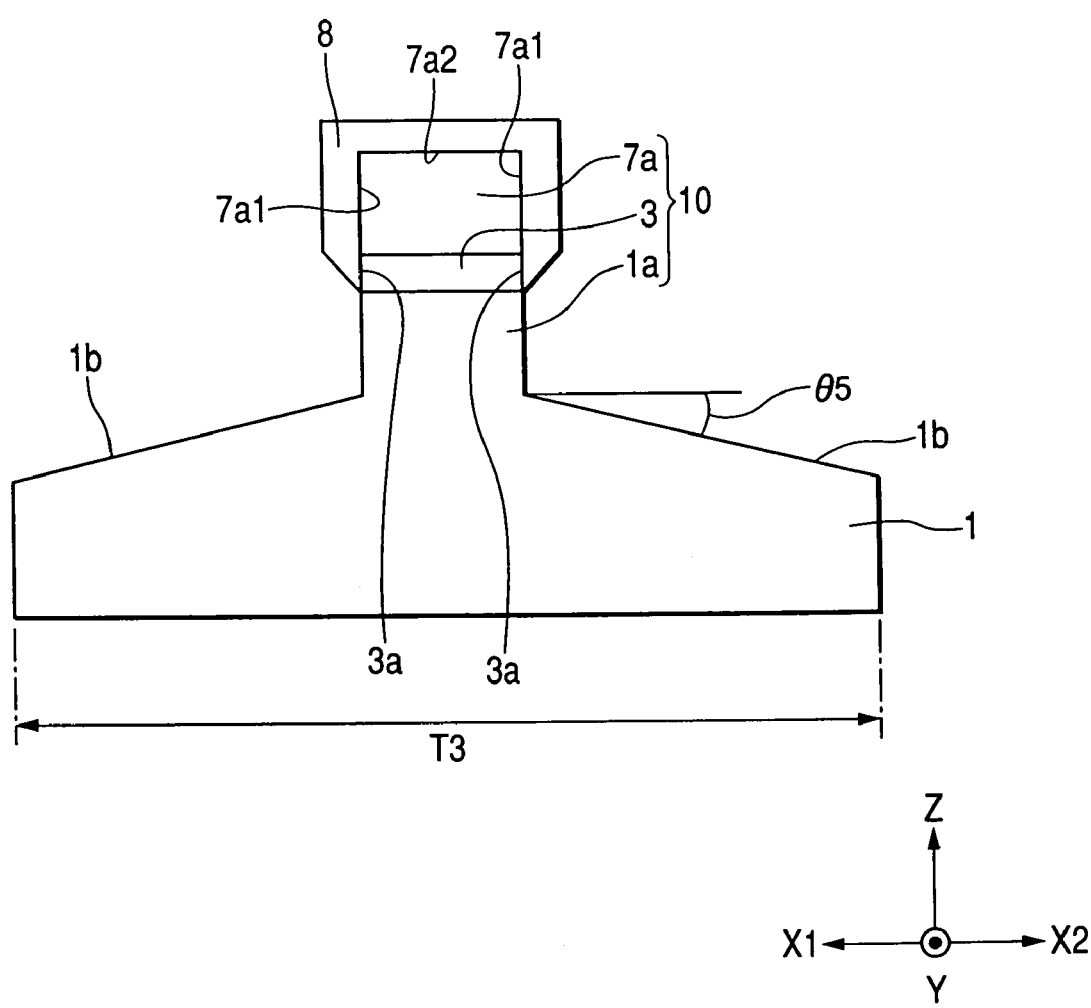
FIG. 3 is a partial front view of the magnetic head shown in FIG. 1, which is viewed from the surface opposing a recording medium.

FIG. 1 is a partial perspective view showing a writing magnetic gap forming portion of a magnetic head according to an embodiment of the present invention, FIG. 2 is a cross-sectional view of line II—II of the magnetic head shown in FIG. 1, and FIG. 3 is a partial front view of the magnetic head shown in FIG. 1, which is viewed from the surface (the reference numeral F shown in FIGS. 1 and 2) opposing a recording medium.

The magnetic head H1 shown in FIGS. 1 to 3 has a writing inductive head Hw, and the inductive head is laminated on a reading head (not shown) using the magnetoresistance effect. However, the magnetic head H1 may be composed of only the inductive head Hw, without providing the reading head.

Reference numeral 1 shown in FIGS. 1 to 3 denotes a lower core layer formed of a soft magnetic material having a high magnetic permeability, such as Fe—Ni based alloy (Permalloy).

Under the lower core layer 1, the reading head (not shown) using the magnetoresistance effect and having a magnetoresistance element layer and a lower shielding layer is provided and the lower core layer 1 may be also used as the upper shielding layer for the magentoresistance element layer. In order to sufficiently accomplish the function as the upper shielding layer, the width T3 in the track width direction (X1-X2 direction shown in FIG. 1) of the bottom surface 1e of the lower core layer 1 is sufficiently larger than the width in the track width direction of the magnetoresistance element layer (not shown).

First, the shape of the lower core layer 1 of the thin film magnetic head shown in FIG. 1 will be described.

As shown in FIGS. 1 to 3, the lower core layer 1 is formed with a rectangular protrusion 1a integral with the lower core layer 1. That is, the both sides 1c, 1c of the protrusion 1a shown in FIG. 1 are the perpendicular surface extending in the vertical direction (Z direction) and a gap opposing surface (the top surface) 1d of the protrusion 1a is the horizontal surface.

As shown in FIG. 1, the width of the protrusion 1a is T1 and the width T1 is equal to the width Tw of the front end 7a of the below-mentioned upper core layer 7. Also, the protrusion 1a is formed integral with the lower core layer 1. In order to easily understand the structure, the protrusion 1a is shown with a hatching which is different from that of the lower core layer 1 (the lower core layer having slopes 1b).

Further, the slopes 1b, 1b are formed on the top surface of the lower core layer 1 extending in the both sides of the base end of the protrusion.

Furthermore, as mentioned above, the bottom surface 1e of the lower core layer 1 is formed with a width T3 and the width T3 is sufficiently larger than the width T1 of the protrusion 1a.

In the inductive head Hw, it is preferable that the height H of the protrusion 1a is two times or four times as large as the film thickness of the gap layer 3.

In case that the height H of the protrusion 1a is shorter than or equal to the film thickness of the gap layer 3, the leakage magnetic field is apt to be generated between the front end 7a and the lower core layer 1 (the lower core layer having the slopes 1b) extending in the both sides of the protrusion 1a, and thus light fringing is not suppressed well.

Furthermore, in the present invention, the slope angle θ5 between the slope 1b of the lower core layer 1 and a surface 1d opposing the gap is preferably in the range of 2° to 15°.

If the slope angle θ5 of the slope 1b is less than 2°, the leakage magnetic field is apt to be generated between the upper core layer 7 and the lower core layer 1 (the lower core layer having the slopes 1b) extending from the base end of the protrusion 1a, and thus light fringing is not suppressed well.

Moreover, if the slop, angle θ5 of the slope 1b is greater than 15°, the slope 1b is separated from the upper core layer 7 and thus it is difficult to generate the leakage magnetic field between the upper core layer 7 and the lower core layer 1 (the lower core layer having the slopes 1b) extending from the base end of the protrusion 1a, thereby increasing suppression of light fringing. However, if the slope angle θ5 of the slope 1b is greater than 15°, the film thickness at the vicinity of the both ends of the lower core layer 1 becomes smaller or the width T3 of the bottom surface 1e of the lower core layer 1 becomes short. Thereby, the function of the upper shielding layer for the magnetoresistance element layer (not shown) of the lower core layer 1 is deteriorated.

Since the protrusion 1a is formed, the leakage magnetic field generated between the protrusion and the upper core layer is surely converged into the track width Tw of the upper core layer, thereby suppressing the light fringing.

shown in FIG. 2, the length in the depth direction of the protrusion 1a is Gd and Gd is the gap depth.

As shown in FIG. 2, the back side in the height direction (Y direction) of the lower core layer 1 is formed with a back gap layer 12 made of a magnetic material and, and on the lower core layer 1 between the protrusion 1a and the back gap layer 12, a portion of a coil layer 5 is provided through a coil insulating underlaying layer 4 composed of an inorganic material such as $Al_2O_5$ or an organic insulating material such as a resist material.

The coil layer 5 is formed of a conductive material having a low electric resistance, such as Cu or Au. The coil layer 5 is flat so as to have the spiral shape at the periphery of the back gap layer 12. Also, an insulating layer 6 composed of an organic material such as a resist material is covered around the periphery of the coil layer 5.

The top surface 4a of the coil insulating underlaying layer 4 and the top surface 6a of the insulating layer 6 from the gap opposing surface (the top surface) 1b of the protrusion 1a are the planarizing surface.

As shown in FIG. 2, the gap layer 3 is formed on the gap opposing surface (the top surface) 1b of the protrusion 1a, the top surface 4a of the coil insulating underlaying layer 4, and the top surface 6a of the insulating layer 6. The gap layer 3 may be formed of a single layer film of $SiO_2$, $Ta_2O_5$, $Si_3N_4$, TiO, $Ti_2O_3$, $Ti_3O_5$, $TiO_2$, $WO_3$, Ru, Ti, Ta or a composite film or a multilayer film made of at least two kinds thereof.

The top surface 12a of the back gap layer 12 from the top surface 3c of the gap layer 3 is the same planarizing surface A. Also, the upper core layer 7 is formed from the top surface 3c of the gap layer 3 to the top surface 12a of the back gap layer 12.

The upper core layer 7 is formed of the magnetic material having a high magnetic permeability, such as Permalloy, and is formed by a plating process and the front end 7a is bonded onto the gap opposing surface 1d of the protrusion 1a through the gap layer 3 to form the magnetic gap having the gap length G1.

The magnetic pole 10 is composed of the protrusion 1a, the gap layer 3 and the front end 7a of the upper core layer 7.

As shown in FIG. 1, the width of the front end 7a of the upper core layer 7 is Tw. As mentioned above, the width Tw and the width T1 of the gap opposing surface 1d of the protrusion 1a are equal to each other (Tw=T1). Also, the track width of the magnetic gap is determined by Tw (=T1). Moreover, as shown in FIG. 2, the upper core layer and the lower core layer 1 are magnetically connected to each other through the back gap layer 12. The track width Tw of the front end 7a is 0.1 to 0.2 µm.

As shown in FIGS. 1 and 2, in the magnetic pole 10, a non-magnetic material layer 8 is formed from the side 7a1 of the front end 7a and the side 3a of the gap layer 3 to the top surface 7a2 of the front end 7a. The non-magnetic material layer 8 is successively formed from the pole 10 toward the height direction (Y direction) so as to cover the upper core layer 7. The non-magnetic material layer 8 may be formed of a single layer film of, for example, $SiO_2$, $Al_2O_3$, Ru, Ta, Ti or a composite film or a multilayer film made of at least two kinds thereof.

Figure 4:
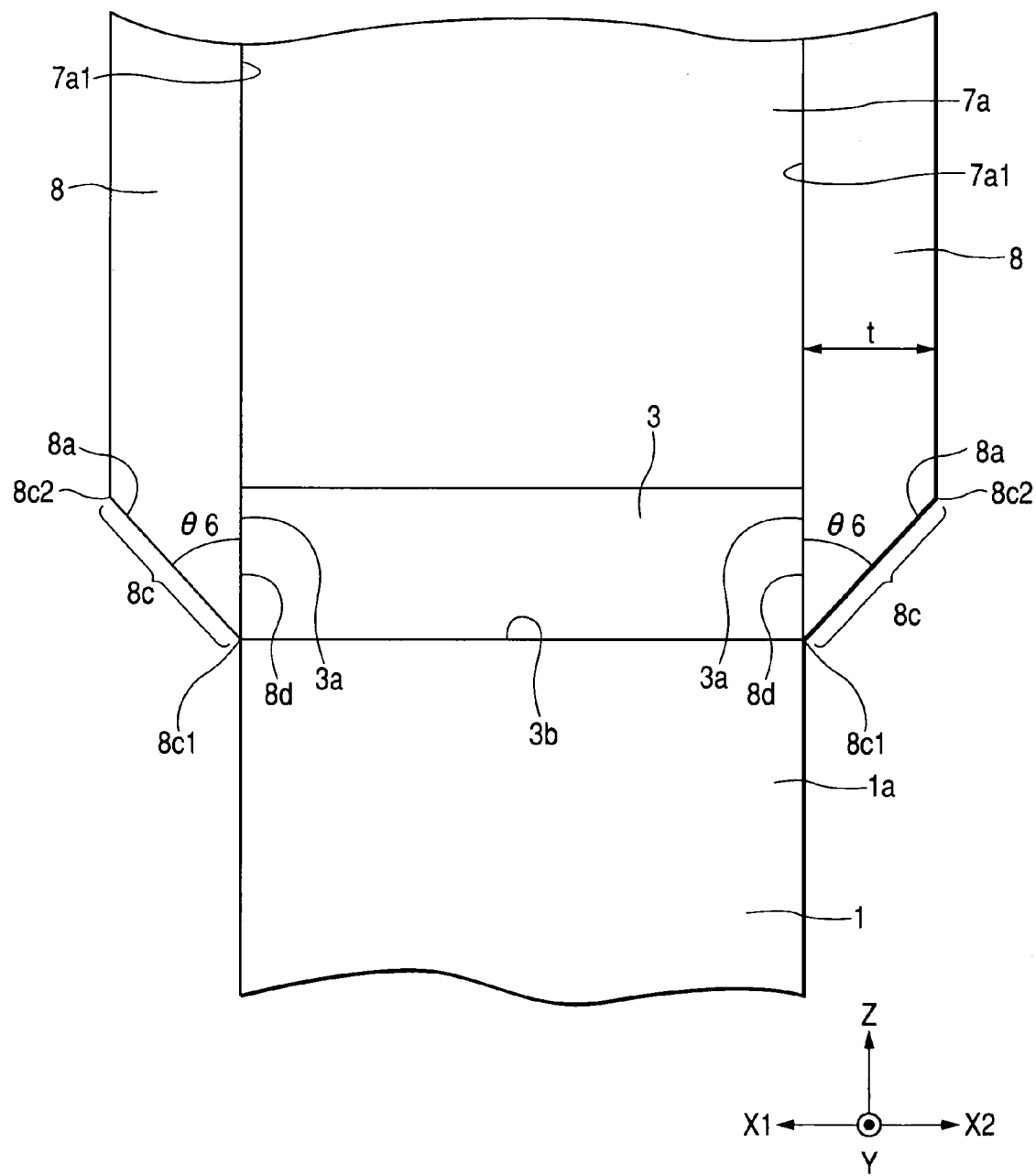
FIG. 4 is a partial enlarged front view of FIG. 3.

FIG. 4 is an enlarged front view of the vicinity of the gap layer 3 of FIG. 3.

At the region that the non-magnetic material layer 8 opposes the gap layer 3 in the track width direction (X1-X2 direction), a taper region 8c of which the width in the track width direction (X1-X2 direction in the drawing) of the non-magnetic material layer 8 becomes gradually narrow is formed. The angle θ6 between the outside 8a and the inside 8d of the non-magnetic material layer 8 at the taper region 8c is preferably in the range of 10° to 60°. The film thickness t (see FIG. 4) of the track width direction (X1-X2 direction in the drawing) in the region other than the taper region 8c of the non-magnetic material layer 8 is 100 to 200 Å.

As shown in FIG. 4, the lower periphery 8c1 of the taper region 8c formed in the non-magnetic material layer 8 is formed at the height equal to the location (height) of the height direction (Z direction) of the lower surface 3b of the gap layer 3. Further, the lower periphery 8c1 is contacted with the lower surface 3b of the gap layer 3 in the line shape. Accordingly, in the manufacturing step shown in FIG. 11 which will be described later, the width of the track width direction of the protrusion 1a formed in the lower core layer 1 can be equal to the width of the track width direction of the front end 7a of the upper core layer 7, and thus the light fringing can be suppressed. Also, the height of the upper periphery 8c2 of the taper region 8c is not specially limited.

On the non-magnetic material layer 8, a protecting film (not shown) formed of a non-magnetic material such as alumina is covered.

Figure 5:
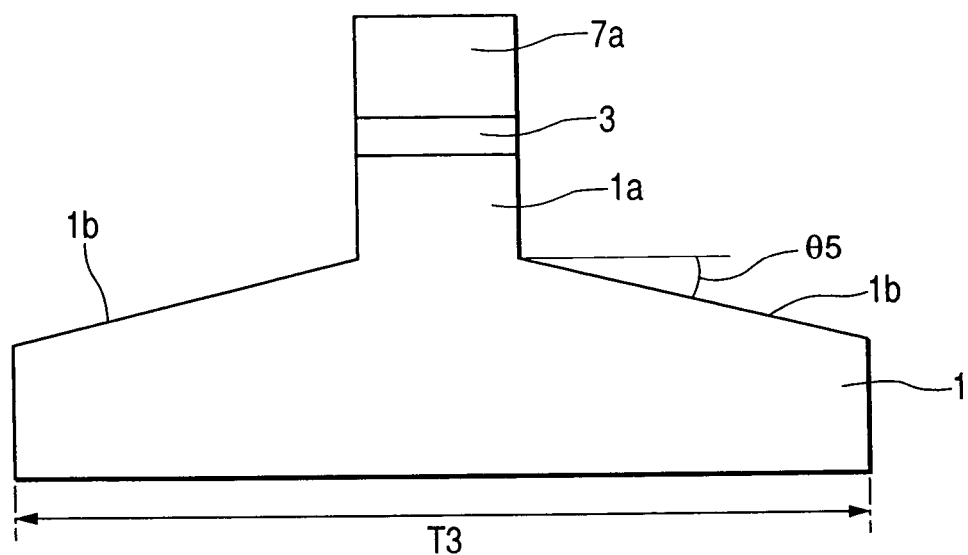
FIG. 5 is a partial front view of a modified example of the magnetic head according to the embodiment of the invention, which is viewed from the surface opposing a recording medium.

Also, as shown in FIG. 5, the non-magnetic material layer 8 may be not composed in the inductive head Hw.

If the recording current is applied to the coil layer 5 in the inductive head, the recording magnetic field is induced to the lower core layer 1 and the upper core layer 7, and, at the portion of the gap length G1, the magnetic signal is recorded in the recording medium such as the hard disk, by the leakage magnetic field between the protrusion 1a and the front end 7a of the upper core layer 7.

In the inductive head Hw shown in FIGS. 1 to 3, since the width T1 of the gap opposing surface 1d of the protrusion 1a is equal to the width Tw of the front end 7a of the upper core layer 7, the range that the recording magnetic field is permeated from the track width determined by Tw becomes narrow, and thus the light fringing can be suppressed.

Particularly, if the shape of the protrusion is rectangular as the protrusion 1a shown in FIG. 1, the leakage magnetic field generated between the protrusion 1a and the front end 7a of the upper core layer 7 is substantially surely converged in the track width Tw and thus the light fringing can be suppressed.

Also, since the slope 1b is formed on the lower core layer 1 and thus the distance between the slope 1b and the upper core layer 7 can be widened, it is difficult to generate the leakage magnetic field between the upper core layer 7 and the lower core layer 1 extending from the base end of the protrusion 1a and thus the light fringing can be suppressed.

Particularly, as mentioned above, the height H of the protrusion 1a is two times or four times as large as the film thickness of the gap layer 3, and, if the slope angles θ5 of the slopes 1b, 1b of the lower core layer 1 are in the range of 2° to 15°, the light fringing can be more suppressed and the function as the upper shielding layer of the lower core layer 1 is not deteriorated.

Also, as shown in FIG. 2, since the upper core layer 7 can be formed on the planarizing surface A in the magnetic head H1, the upper core layer 7 can be precisely formed in a predetermined shape. Particularly, since the width of the front end 7a of the upper core layer 7 in the track width direction (X direction) of the surface opposing the recording medium is controlled to the track width Tw, the upper core layer 7 can be formed on the planarizing surface A and thus the track width Tw can be precisely controlled to a narrow width. Accordingly, it can properly correspond to the future high recording density.

As mentioned above, since the light fringing can be efficiently suppressed in the present invention and the track width Tw can be precisely controlled, the signal can be recorded in the recording medium at a short track pitch and the high precision recording can be performed.

Next, the method of manufacturing the inductive head Hw shown in FIGS. 1 to 4 will be described with reference to FIGS. 6 to 13. Also, the FIGS. 6 to 13 are front views showing the state which is viewed from the surface F opposing the recording medium in each step.

First, after forming the protrusion 1a shown in FIG. 2 in the lower core layer 2, the back gap layer 12 is formed at the location separated by a predetermined distance in the height direction (Y direction in FIG. 2) of the protrusion 1a (see FIG. 2).

Also, on the lower core layer 1 between the protrusion 1a and the back gap layer 12, the coil layer 5 is formed by plating the conductive material having a low electric resistance, such as Cu or Au, through the coil insulating underlaying layer 4 composed of organic insulating material such as resist material or inorganic material such as $Al_2O_5$. The coil layer 5 is flat so as to have spiral shape at the periphery of the back gap layer 12. At the periphery of coil layer 5, the insulating layer 6 composed of organic material such as resist material is formed (see FIG. 2).

Furthermore, the top surface 4a of the coil insulating underlaying layer 4, the top surface 6a of the insulating layer 6, and the gap opposing surface (the top surface) 1b of the protrusion 1a are cut by a CMP method and the gap opposing surfaces (the top surface) 1b, 4a, 6a are formed as the planarizing surface (see FIG. 2).

Next, the gap layer 3 is formed on the gap opposing surface (the top surface) 1b of the protrusion 1a, the top surface 6a of the insulating layer 6, and the top surface 4a of the coil insulating underlaying layer 4. The gap layer 3 may be formed of a single layer film of $SiO_2$, $Ta_2O_5$, $Si_3N_4$, TiO, $Ti_2O_3$, $Ti_3O_5$, $TiO_2$, $WO_3$, Ru, Ti, Ta or a composite film or a multilayer film made of at least two kinds thereof. At this time, the top surface 12a of the back gap layer 12 and the top surface 3c of the gap layer 3 are formed as the same polarization surface A (see FIG. 2).

Figure 6:
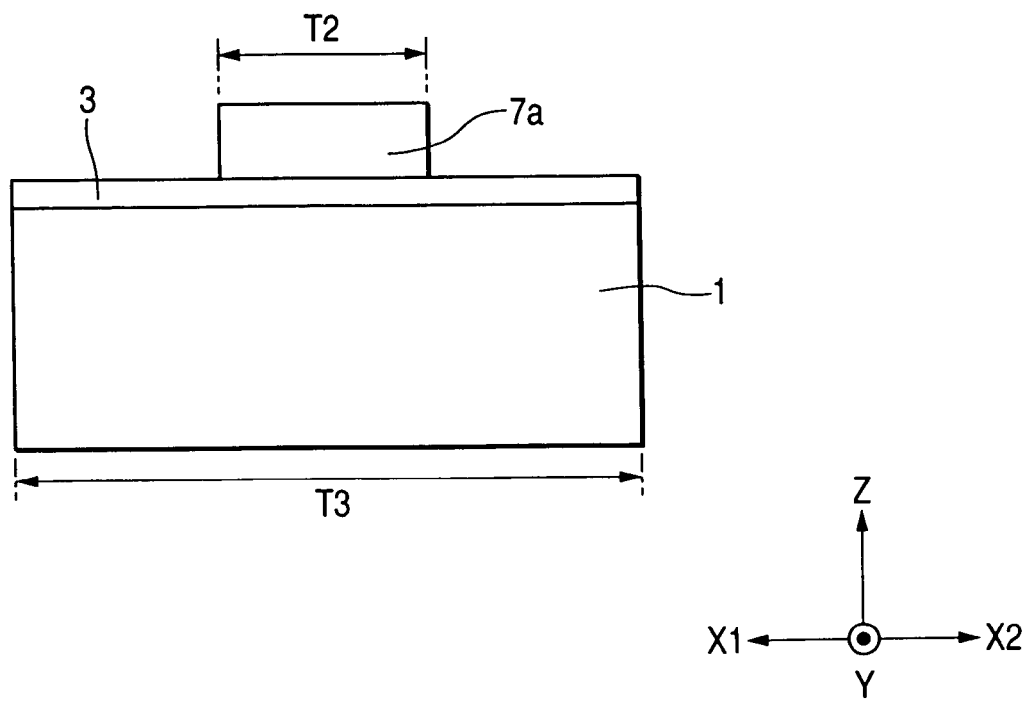
FIG. 6 shows a step of a method of manufacturing the magnetic head shown in FIG. 1.

Next, on the gap layer 3, the front end 7a of the upper core layer 7 is formed with the width T2 of the track width direction (X1-X2 direction in the drawing). The method of forming the front end 7a is as follows: First, the resist pattern (not shown) is formed on the gap layer 3 other than the shape region of the front end 7a of the upper core layer 7. Further, the soft magnetic material composing the front end 7a of the upper core layer 7 is plated on the portion on which the resist pattern is not formed and then the resist material is removed. Thereby, the front end 7a of the upper core layer 7 is formed on the gap layer 3. The front view which is viewed from the surface F opposing the recording medium at this time is shown in FIG. 6.

Figure 7:
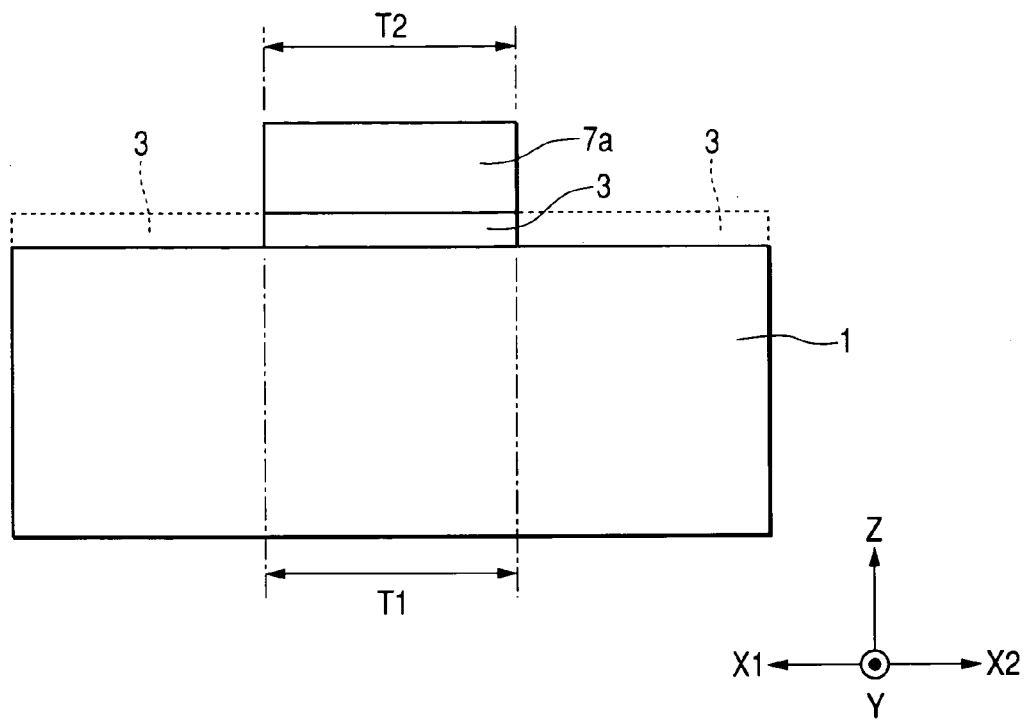
FIG. 7 shows the step following the step shown in FIG. 6.

Next, as shown in FIG. 7, the both sides of the gap layer 3 (the portion shown by the dotted line) is removed by a conventional method such as a plasma etching method, while leaving the gap layer 3 interposed between the front end 7a of the upper core layer 7 and the protrusion 1a of the lower core layer 1.

Figure 8:
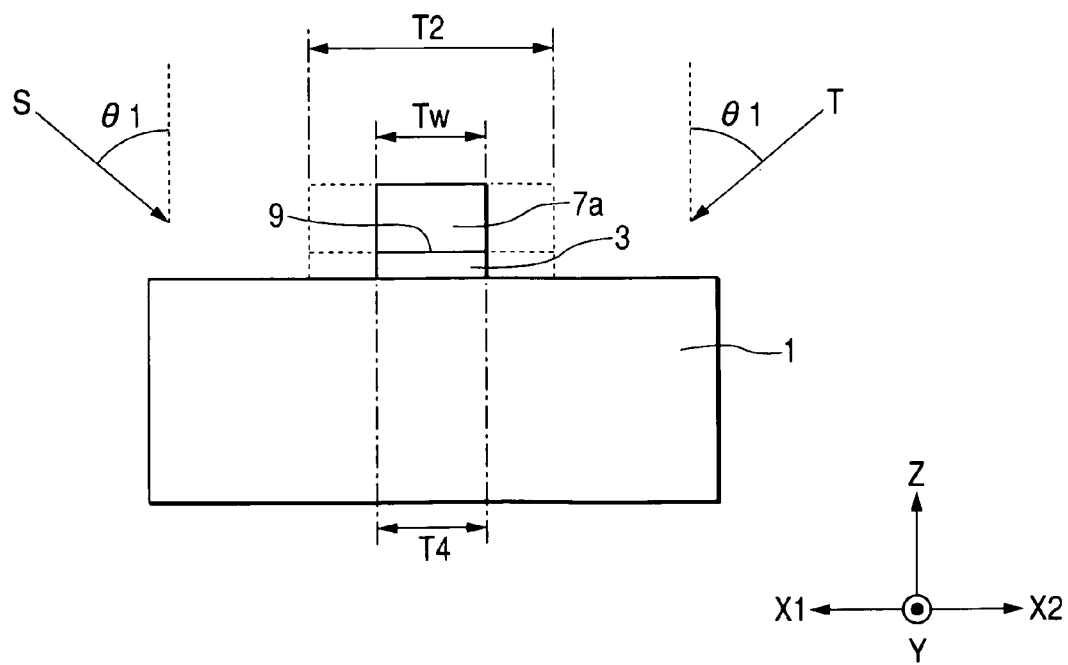
FIG. 8 shows the step following the step shown in FIG. 7.

Next, as shown in FIG. 8, the portion of the front end 7a shown by the dashed line in the drawing and the portion of the gap layer 3 shown by the dashed line in the drawing are cut in the track width direction (X1-X2 direction) by a primary ion milling process such that the widths of the front end 7a and the gap layer 3 become T2 to T4. The width T4 becomes the track width Tw of the inductive head Hw shown in FIGS. 1 to 4.

In the ion milling process performed in the step shown in FIG. 8, Ar gas which is neutrally ionized is used. In the primary ion milling process, the ion irradiation is performed in arrow S direction and the arrow T direction inclined by the angle θ1 with respect to the direction perpendicular to the boundary 9 between the gap layer 3 and the front end 7a of the upper core layer 7. The ion irradiating angle θ1 is preferably in the range of 50° to 60°. If the angle θ1 is in the above-mentioned range, the front end 7a can be prevented from being reattached to the lower core layer 1 or the front end 7a upon the ion milling process.

Also, the width T2 which is equal to the track width Tw after the ion milling process of the front end 7a is 0.1 to 0.2 µm.

Figure 9:
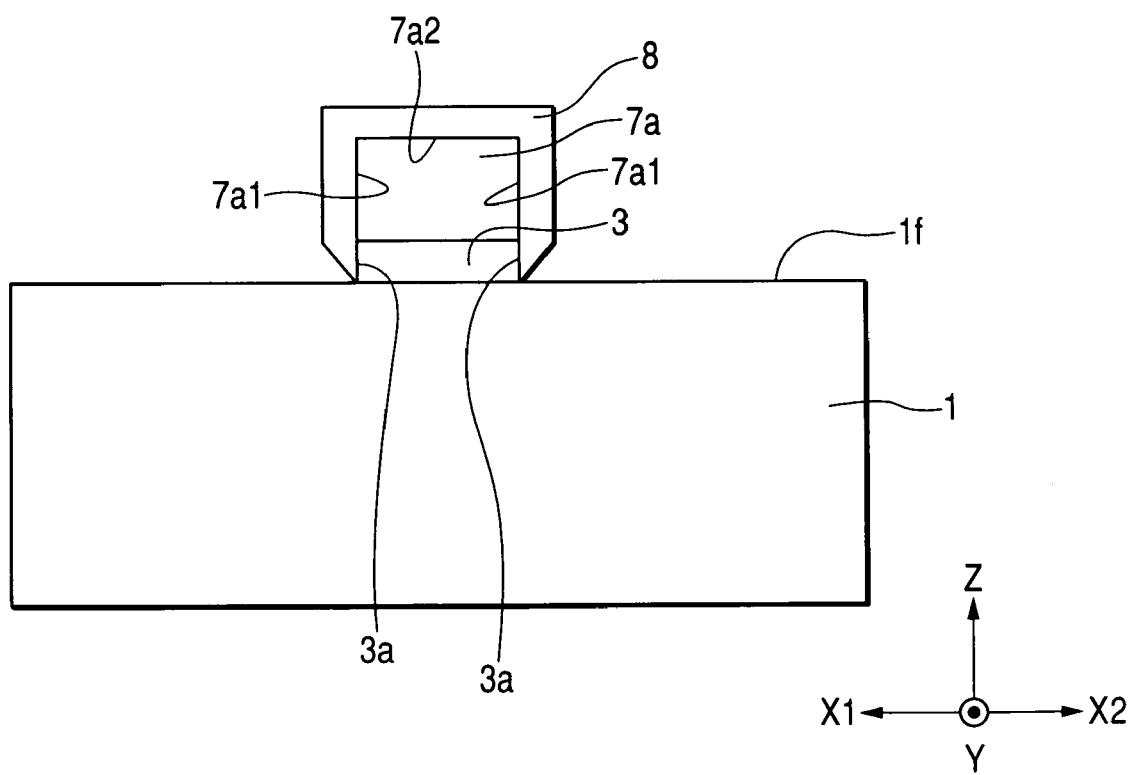
FIG. 9 shows the step following the step shown in FIG. 8.

Next, as shown in FIG. 9, the non-magnetic material layer 8 is formed on the side 3a of the gap layer 3, the side 7a1 of the front end 7a, and the top surface 7a2 of the front end 7a. It is preferable that the non-magnetic material layer 8 is formed of the material having a milling rate slower than that of the lower core layer 1. This reason will be disclosed in the descriptions of the steps shown in FIGS. 11 and 14. Accordingly, the non-magnetic material layer 8 may be formed of, for example, a single layer film of $SiO_2$, $Al_2O_3$, Ru, Ta, Ti or a composite film or a multilayer film made of at least two kinds thereof. Also, the non-magnetic material layer 8 is formed to cover the upper core layer 7 from the pole 10 toward the height direction (Y direction).

Figure 10:
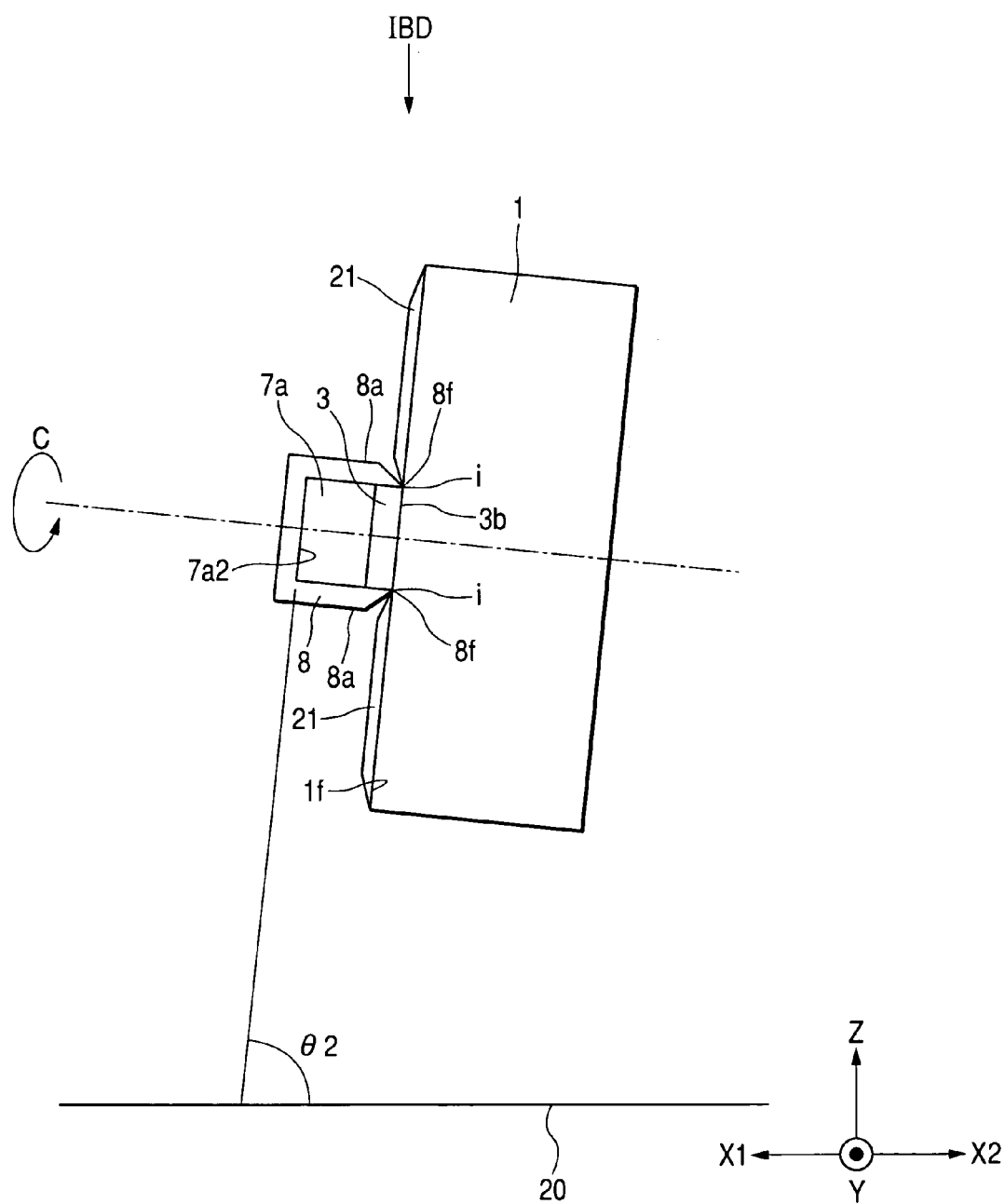
FIG. 10 shows the step following the step shown in FIG. 9.

At this time, as shown in FIG. 10, in the element during the step shown in FIG. 9, by performing IBD (Ion Beam Deposition) method on the front end 7a and the gap layer 3 while rotating the top surface 7a2 of the front end 7a of the upper core layer 7 with respect to the imaginary horizontal line 20 extending in the horizontal direction (X1-X2 direction in the drawing), the non-magnetic material layer 8 can be formed. Here, angle θ2 is preferably in the range of 70° to 90°. If the angle θ2 is in the above-mentioned range, the top surface 1f of the lower core layer 1 becomes the wall at the vicinity of the lower surface 3b of the gap layer. Accordingly, at the vicinity of the lower surface 3b, it is difficult to laminate the non-magnetic material layer 8 and thus the film thickness of the non-magnetic material layer 8 becomes thin (shadow effect). On the other hand, since the shadow effect that the lower core layer 1 becomes the wall is reduced as going toward the top surface 7a2 of the front end 7a from the lower surface 3b of the gap layer 3, the non-magnetic material layer 8 is apt to be laminated and the film thickness of the non-magnetic material layer 8 becomes thick. At the result, as shown in FIG. 4, the non-magnetic material layer 8 formed at the vicinity of the lower surface 3b of the gap layer 3 is formed with the taper region 8c of which the film thickness t is reduced toward the top surface 1f of the lower core layer 1.

In the IBD step, since the non-magnetic material layer 8 is formed on the contact line (i) between the side 3a of the gap layer and the top surface 1f of the lower core layer, the lower periphery 8c1 of the taper region 8c is formed in contact with the top surface 1f of the lower core layer 1, as shown in FIG. 12. Also, the lower periphery 8c1 is formed at the height equal to the height in the location of the height direction (Z direction in FIG. 4) of the lower surface 3b of the gap layer 3.

Also, in the IBD step shown in FIG. 10, the material layer 21 having the same material as the non-magnetic material layer 8 is laminated on the top surface 1f of the lower core layer 1, and then the material layer 21 is removed by a RIE (Reactive Ion Etching) method and thus the top surface 1f of the lower core layer 1 is cleaned, as shown in FIG. 9.

Figure 11:
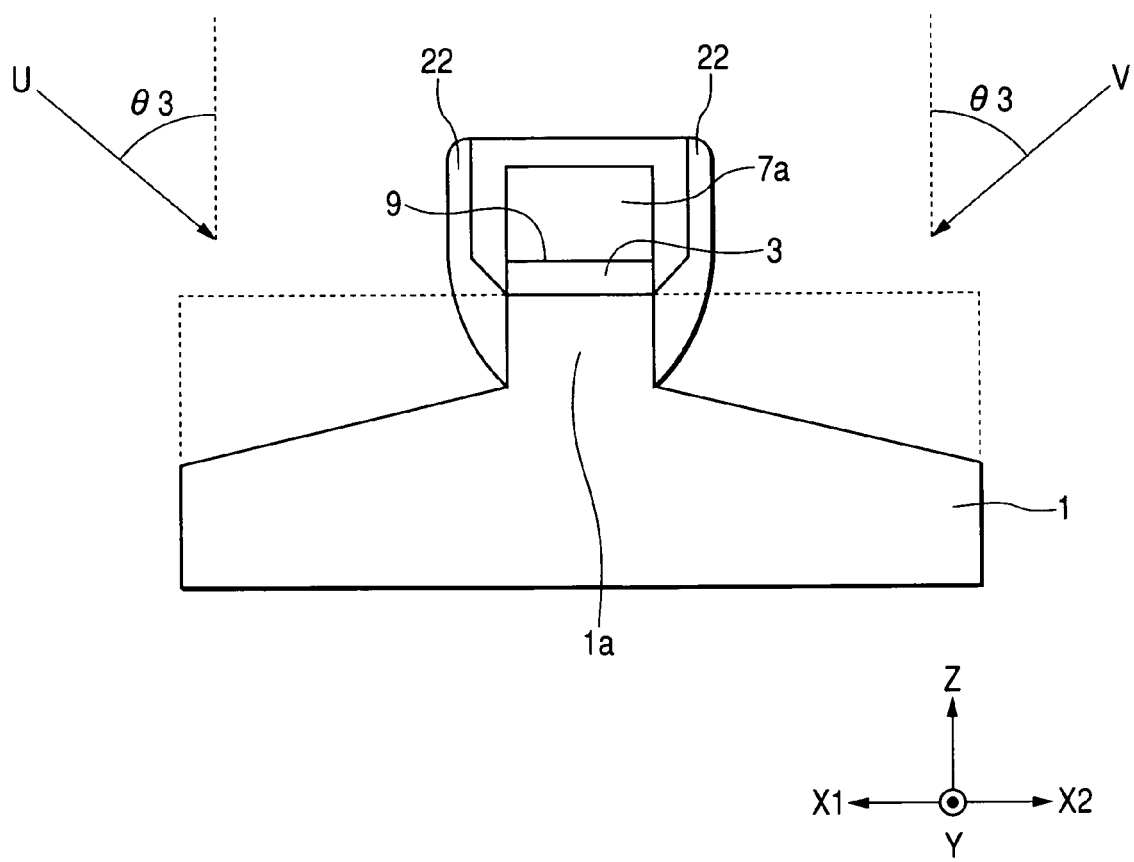
FIG. 11 shows the step following the step shown in FIG. 10.

Next, as shown in FIG. 11, a secondary ion milling process is performed on the top surface 1f of the lower core layer 1 to cut the dashed line portion shown in FIG. 11 and thus the slopes 1b, 1b are formed on the lower core layer 1 and the lower core layer 1 is cut in the lower direction (the direction opposite to the Z direction in the drawing) to form the protrusion 1a.

At this time, if the non-magnetic material layer 8 is formed of the material having the milling rate slower than that of the lower core layer 1, the lower core layer 1 is rapidly cut, compared with the non-magnetic material layer

8. Accordingly, even when the lower core layer 1 is cut to form the protrusion 1*a*, the non-magnetic material layer 8 is not so cut and thus the front end 7*a* of the upper core layer 7 and the gap layer 3 are properly protected from the secondary ion milling process.

In the secondary ion milling process, Ar gas which is neutrally ionized is used, similar to the primary ion milling process. In the secondary ion milling process, the ion irradiation is performed in arrow U direction and the arrow V direction inclined by the angle θ3 with respect to the direction perpendicular to the boundary 9. Here, the ion irradiating angle θ3 is preferably in the range of 30° to 50°.

If the ion is irradiated from the arrow U and arrow V directions, the top surface 1*f* of the lower core layer 1 is diagonally cut by the physical operation to form the slopes 1*b*, 1*b* in the lower core layer 1. Also, it is preferable that the time of the ion milling process and the ion irradiating angle θ2 are properly adjusted such that the slope angles θ5 of the slopes 1*b*, 1*b* are in the range of 2° to 10°.

In the secondary ion milling process, if the angle θ6 between the outside 8*a* and the inside 8*d* of the non-magnetic material layer 8 in the taper region 8*c* formed in the non-magnetic material layer 8 is in the range of 10° to 60°, the lower core layer 1 can be easily cut with the track width Tw controlled in the front end 7*a* and thus the width in the track width direction of the protrusion 1*a* can easily form as the track width Tw.

As shown in FIG. 12, the lower periphery 8*c*1 of the taper region 8*c* formed in the non-magnetic material layer 8 is formed in contact with the top surface 1*f* of the lower core layer 1, and is formed at the same location in the height direction (Z direction in the drawing) of the lower surface 3*b* of the gap layer 3. Also, the lower periphery 8*c*1 is contacted with the lower surface 3*b* of the gap layer 3 in the line shape and is contacted with the contact line (i) in the line shape. Accordingly, in the secondary ion milling process, since the width in the track width direction (X1-X2 direction in the drawing) of the protrusion 1*a* formed in the lower core layer 1 can become the width in the track width direction (X1-X2 direction in the drawing) of the front end 7*a* of the upper core layer 7, the width in the track width of the protrusion 1*a* can become the width in the track width direction of the front end 7*a* and thus the light fringing can be suppressed. Also, the height of the upper periphery 8*c*2 of the taper region 8*c* is not specially limited.

As shown in FIG. 13, if the taper region 8*c* is not formed in the non-magnetic material layer 8 and the non-magnetic material layer 8 is formed with the same film thickness even in any location of the height direction (Z direction in the drawing), the lower core layer 1 is cut with the distance W1 between one outside 8*a* and the other outside 8*a* of the lower periphery 8*e* of the non-magnetic material layer 8 upon the secondary ion milling process and thus the width in the track width direction (X1-X2 direction in the drawing) of the protrusion 1*a* becomes equal to the interval W1. Accordingly, the width in the track width direction (X1-X2 direction in the drawing) of the protrusion 1*a* becomes larger than the width in the track width direction (X1-X2 direction in the drawing) of the front end 7*a* of the upper core layer 7 and thus the light fringing is apt to be generated.

In the steps shown in FIG. 11, the material layer 22 which has the same material as the lower core layer 1 and is cut so as to form the slopes 1*b*, 1*b* is adhered to the outside 8*a* of the non-magnetic material layer 8.

Figure 14:
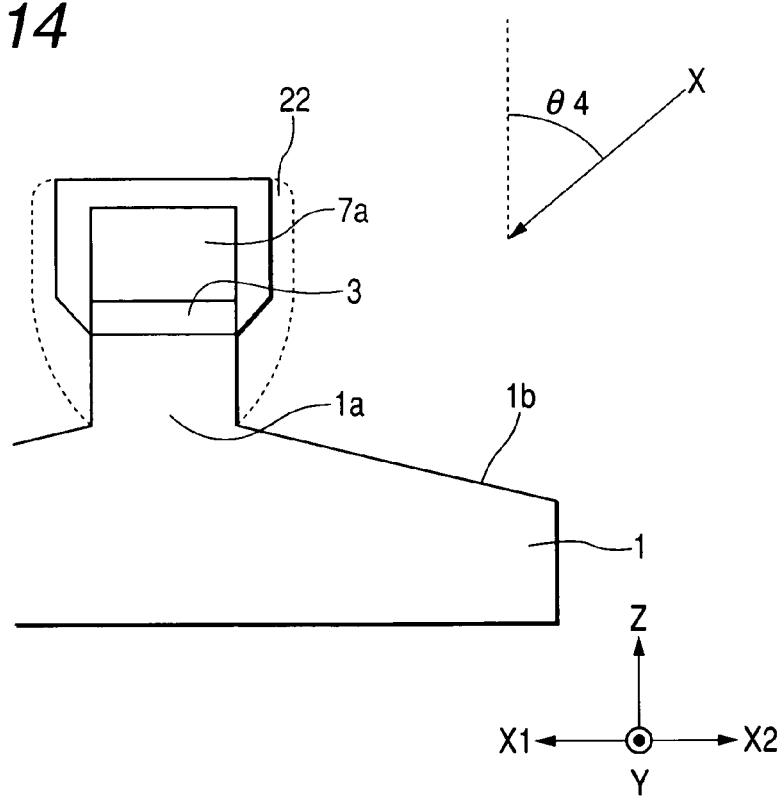
FIG. 14 shows the step following the step shown in FIG. 11.
Figure 15:
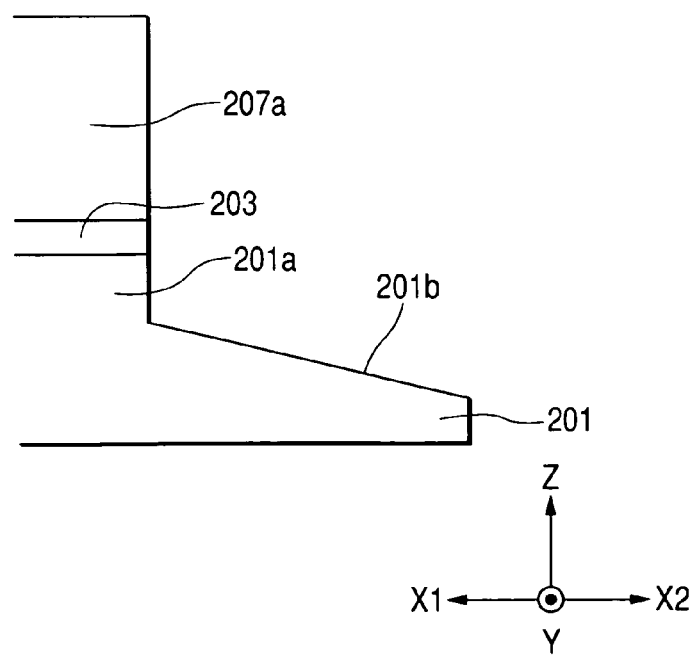
FIG. 15 is a partial front view of a modified example of a conventional magnetic head, which is viewed from the surface opposing the recording medium.
Figure 17:
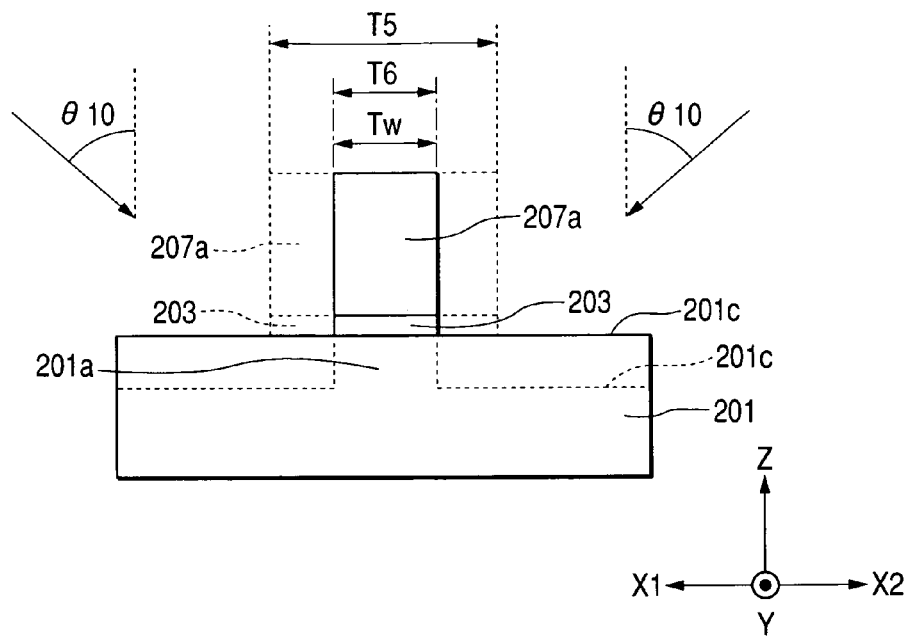
FIG. 17 shows a step of a method of manufacturing the magnetic head shown in FIG. 15.
Figure 18:
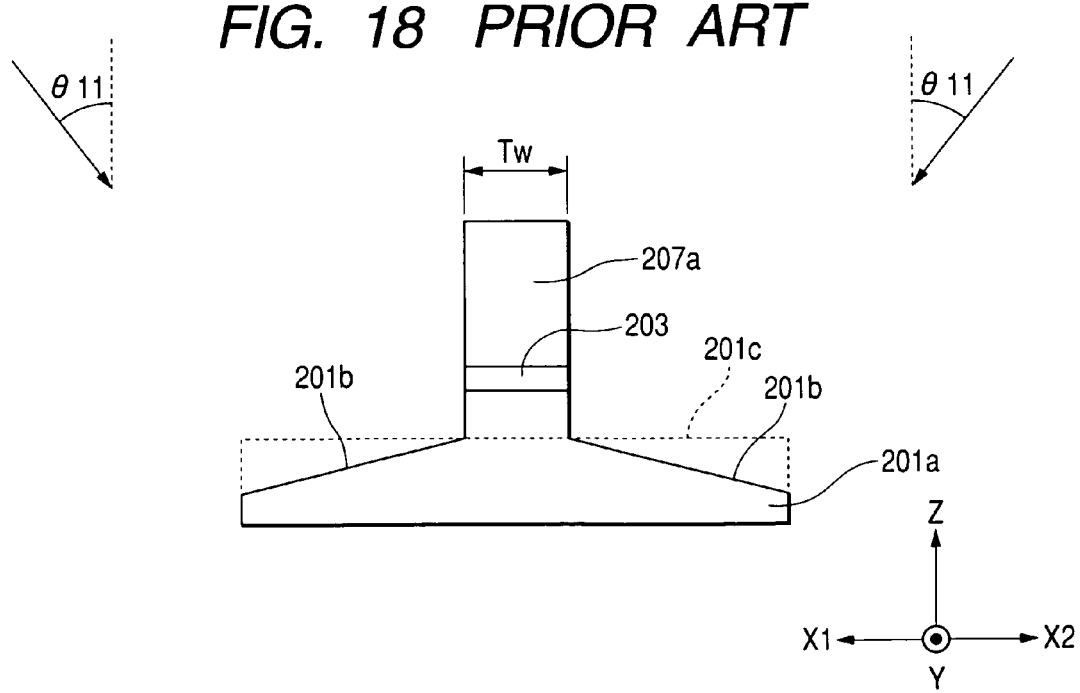
FIG. 18 shows the step following the step shown in FIG. 17.

Next, in the process shown in FIG. 14, if the material layer 22 is removed by a third ion milling process (the portion shown by the dotted line is removed), the inductive head Hw shown in FIGS. 1 to 4 is manufactured. Upon the third ion milling process, since the front end 7*a* is protected by the non-magnetic material layer 8, the track width Tw controlled in the step shown in FIG. 8 is not varied. Accordingly, the track width Tw can be precisely controlled and the inductive head Hw having uniform quality can be manufactured.

Particularly, in the magnetic head H1, since the upper core layer 7 can be formed on the planarizing surface A composed of the top surface 3*c* of the gap layer 3 and the top surface 12*a* of the back gap layer 12, the upper core layer 7 can be flat formed, without being curved. Accordingly, since the resist pattern can be formed with a small film thickness when forming the upper core layer 7, the front end 7*a* of the upper core layer 7 can be thinly formed. Also, since the upper core layer 7 can be flat formed without being curved, the resist pattern formed when forming the upper core layer 7 can be precisely formed and thus the upper core layer 7 can be precisely formed in a predetermined shape.

That is, since the width of the front end 7*a* of the upper core layer 7 in the track width direction (X direction in the drawing) of the surface opposing the recording medium is controlled to the track width Tw, the upper core layer 7 can be formed on the planarizing surface A and thus the track width Tw can be precisely controlled to the narrow width.

In the method of manufacturing the magnetic head H1 according to the invention, since the track width Tw precisely formed on the planarizing surface A with the narrow width is not varied in the following steps, it is very suitable for manufacturing the magnetic head H1 having the track width Tw precisely formed with the narrow width.

If the non-magnetic material layer 8 is formed of the material having the milling rate slower than that of the lower core layer 1, the material layer 22 formed of the same material as the lower core layer 1 is rapidly cut, compared with the non-magnetic material layer 8. Accordingly, when the material layer 22 is cut to be removed, the non-magnetic material layer 8 is not so cut and thus the non-magnetic material layer 8 can function as a stopper.

Also, if the non-magnetic material layer 8 is formed of Ta or Ti in case that the lower core layer 1 is formed of Fe—Ni based alloy (Permalloy), the milling rate of the non-magnetic material layer 8 can be sufficiently slower that that of the lower core layer 1. The non-magnetic material layer 8 can efficiently function as the stopper.

On the other hand, if the non-magnetic material layer 8 is formed of $SiO_2$ or $Al_2O_3$' the difference between the milling rates of the non-magnetic material layer 8 and the lower core layer 1 is not large, compared with the case that the non-magnetic material layer 8 is formed of Ta or Ti. However, in this case, if the milling rate of the third ion milling process is set to a high value in the step which the material layer 22 is attached in abundance and the milling rate of the third ion milling is set to a low value in the step which the attached amount of the material layer 22 is reduced, the third ion milling process can be efficiently performed and the non-magnetic material layer 8 can function as the stopper.

In the third ion milling process, Ar gas which is neutrally ionized is used, similar to the first ion milling process or the second ion milling process. In the third ion milling process, the ion irradiation is performed in arrow W direction and the arrow X direction. The ion irradiating angle θ4 is preferably in the range of 50° to 70°.

If the angle θ4 is in the above-mentioned range, the material layer 22 adhered to the outside 8*a* of the non-magnetic material layer 8 can be removed, but the slopes 1*b*, 1*b* of the lower core layer 1 can be prevented from being cut.

Also, in order to manufacture the inductive head shown in FIG. 5, it is preferable that the material layer 22 is removed by the third ion milling process in the step shown in FIG. 14 and then the non-magnetic material layer 8 is removed by a fourth ion milling process. The incident angle of the fourth ion milling process is preferably in the range of 40° to 60°.

The invention claimed is:

1. A method of manufacturing a magnetic head having a lower core layer made of a magnetic material, an upper core layer which is made of a magnetic material and opposes the lower core layer with a gap layer interposed therebetween which is made of non-magnetic material and a coil layer which induces a recording magnetic field to the lower core layer and the upper core layer, comprising:
   (a) forming the gap layer on the lower core layer and forming the upper core layer on the gap layer;
   (b) cutting the upper core layer and the gap layer so as to have a track width;
   (c) forming a non-magnetic material layer at the side, a top surface of the upper core layer, and a side of the gap layer, the non-magnetic material layer at the side of the upper core layer and the gap layer having a taper region of which a film thickness in the track width direction is gradually reduced toward the lower core layer, and contacting a lower periphery of the taper region with a top surface of the lower core layer thereupon;
   (d) cutting the top surface of the lower core layer extending from the lower periphery of the taper region to both sides to form slopes inclined in a direction separated from the upper core layer and cutting the lower core layer in a lower direction to form a protrusion having the track width; and
   (e) removing a material layer composed of the same material as the lower core layer adhered to the outside of the non-magnetic material layer, when cutting the lower core layer in the step (d),
   wherein the steps (a) to (e) are carried out in that order.

2. The method according to claim 1, wherein, in the step (c), the non-magnetic material layer is formed by an IBD (Ion Beam Deposition) method performed in the state that the top surface of the upper core layer and the gap layer are sloped by 70° to 90° with respect to a horizontal direction.

3. The method according to claim 1, wherein the step (b) is performed by an ion milling process on which the ions are irradiated from a direction sloped by an angle θ1 with respect to a direction perpendicular to a boundary between the gap layer and the upper core layer.

4. The method according to claim 1, wherein, in the step (c), the non-magnetic material layer is formed of a material having a polishing rate slower than that of the lower core layer.

5. The method according to claim 4, wherein, in the step (c), the non-magnetic material layer is formed of a single layer film of $SiO_2$, $Al_2O_3$, Ru, Ta, Ti or a composite film or a multilayer film made of at least two kinds thereof.

* * * * *